United States Patent
Bhagwat et al.

(10) Patent No.: US 10,176,120 B2
(45) Date of Patent: Jan. 8, 2019

(54) CACHE PREFETCHING IN OFFLOADED DATA TRANSFER (ODX)

(71) Applicant: INTERNATIONAL BUSINESS MACHINES CORPORATION, Armonk, NY (US)

(72) Inventors: Shrirang S. Bhagwat, Pune (IN); Pankaj Deshpande, Pune (IN); Rahul M. Fiske, Pune (IN); Ashwin Joshi, Pune (IN); Subhojit Roy, Pune (IN)

(73) Assignee: International Business Machines Corporation, Armonk, NY (US)

(*) Notice: Subject to any disclaimer, the term of this patent is extended or adjusted under 35 U.S.C. 154(b) by 151 days.

(21) Appl. No.: 15/438,827

(22) Filed: Feb. 22, 2017

(65) Prior Publication Data
US 2018/0239716 A1    Aug. 23, 2018

(51) Int. Cl.
*G06F 12/00* (2006.01)
*G06F 12/126* (2016.01)

(52) U.S. Cl.
CPC .... *G06F 12/126* (2013.01); *G06F 2212/1024* (2013.01); *G06F 2212/154* (2013.01); *G06F 2212/263* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 9,471,306 B2 | 10/2016 | Ueda | |
| 2014/0082310 A1 | 3/2014 | Nakajima | |
| 2015/0142928 A1 | 5/2015 | Fu et al. | |
| 2016/0335186 A1 | 11/2016 | Svendsen | |
| 2017/0293444 A1 | 10/2017 | Furuya | |

OTHER PUBLICATIONS

IBM, List of IBM Patents or Patent Applications Treated as Related, Appendix P, dated Dec. 22, 2017, 2 pages.
Pending U.S. Appl. No. 15/832,804, filed Dec. 6, 2017, entitled: "Cache Prefetching in Offloaded Data Transfer (ODX)", 26 pages.
Weidendorfer et al., "Off-Loading Application Controlled Data Prefetching in Numerical Codes for Multi-Core Processors", Nov. 2008, pp. 1-11.
Mell et al., "The NIST Definition of Cloud Computing", National Institute of Standards and Technology, Special Publication 800-145, Sep. 2011, pp. 1-7.

*Primary Examiner* — Brian R Peugh
*Assistant Examiner* — Jason W Blust
(74) *Attorney, Agent, or Firm* — Tihon Poltavets

(57) ABSTRACT

Cache prefetching in offloaded data transfer (ODX) processes. A populate token command is received to initiate a copy offload operation. Responsive to receiving the populate token command, a cache of a data storage system in a storage area network environment is instructed to prefetch data in accordance with the populate token command and complete an offloaded read request. Responsive to determining that a write using token command is not received within a specified time duration, the prefetched data stored in the cache is evicted.

14 Claims, 5 Drawing Sheets

CACHE PREFETCHING IN OFFLOADED DATA TRANSFER (ODX)

FIELD OF THE INVENTION

The present invention relates generally to the field of copy offload operations, and more particularly improving efficiency of copy offload operations during an offloaded data transfer (ODX) process using cache prefetching.

SUMMARY

Embodiments of the present invention provide systems, methods, and computer program products for cache prefetching in offloaded data transfer (ODX) processes. A populate token command is received to initiate a copy offload operation. Responsive to receiving the populate token command, a cache of a data storage system in a storage area network environment is instructed to prefetch data in accordance with the populate token command and complete an offloaded read request. Responsive to determining that a write using token command is not received within a specified time duration, the prefetched data stored in the cache is evicted.

DETAILED DESCRIPTION

Figure 1:
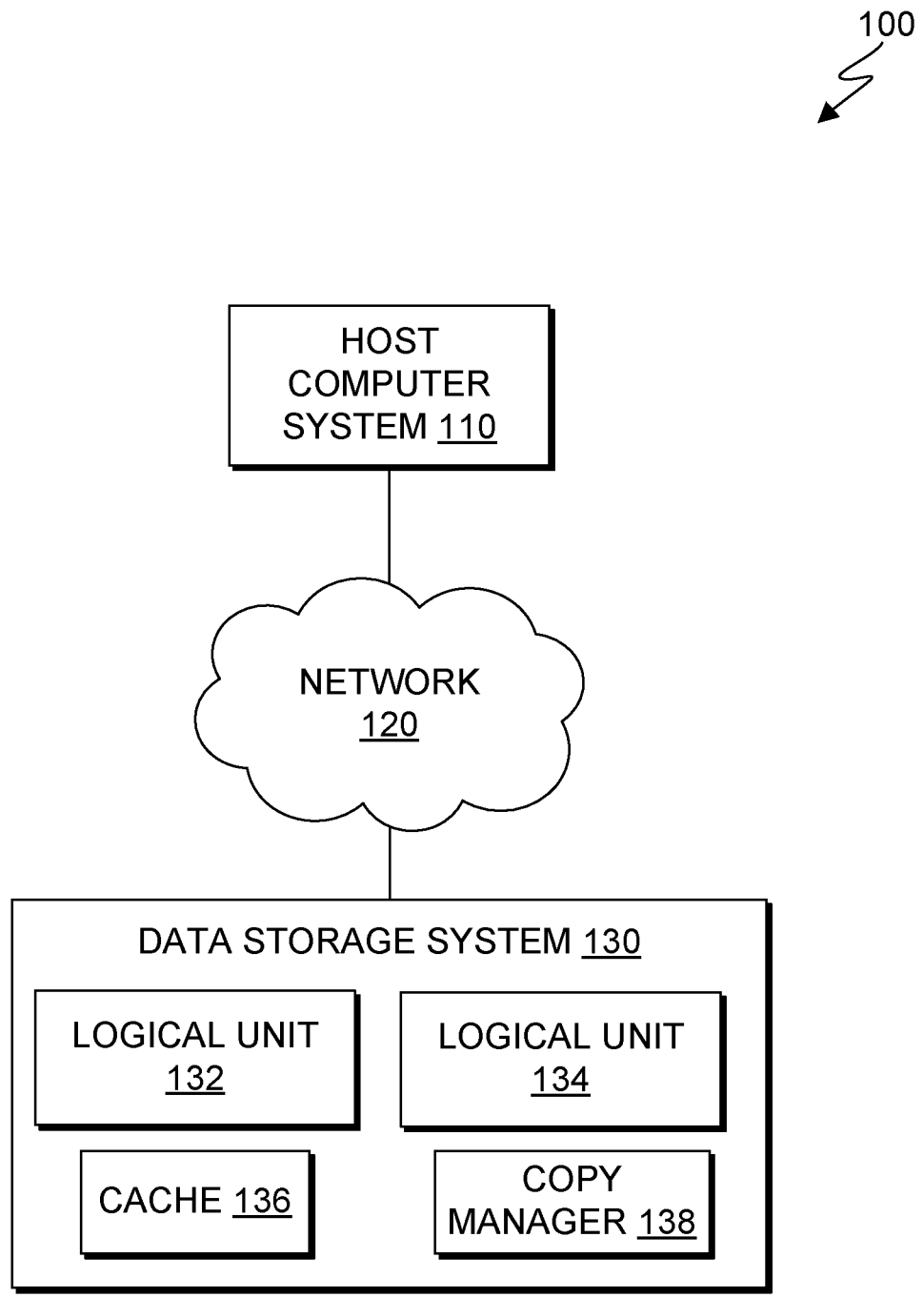
FIG. 1 is a block diagram of a computing environment, in accordance with an embodiment of the present invention.

A Storage Area Network (SAN) is a network that provides block-level network access for data storage. An SAN environment includes a data storage system composed of storage devices (e.g., disk arrays and/or tape libraries) which are accessible to servers (e.g., a host computer system). In an SAN environment, the storage devices appear to the operating system of the host computer system as locally attached devices (i.e., direct-attached storage). Offloaded data transfer (ODX) is a copy mechanism used in an SAN environment to move or copy data from one storage device to another storage device of the data storage system without transferring the data to the host computer system.

Typically, the host computer system includes a software component, such as a client application, which issues Small Computer System Interface (SCSI) commands to another software component, such as a copy manager. A copy manager may be operationally coupled to a logical unit which represents a portion of, one of, and/or a collection of storage devices. The host computer system can use a logical unit number (LUN) to identify logical units for executing SCSI READ and WRITE commands. When an ODX process is initiated, a client application of the host computer system sends a populate token (PT) command to a copy manager. Then, a representation of data (ROD) is created which identifies regions of the storage devices that include data to be copied from a source logical unit, and the ROD is maintained in the copy manager. After the ROD is created, the copy manager generates a unique handle, such as a ROD Token which includes a header that is used in subsequent processing. Subsequently, the client application sends a receive ROD token information (RRTI) command which reports about the ROD creation process. Finally, a write using token (WUT) command is received by the copy manager which instructs the source logical unit to copy the data to a target logical unit.

In typical ODX processes, copy offload operations are performed on data that is sequential in nature. Furthermore, copy offload operations are interspersed with normal client application write input/output (I/O) operations. In this manner, normal client application write I/O operations interrupt the sequential I/O pattern of READ commands for copy offload operations. Another factor that may impact performance of SAN environments during ODX processes is that READ commands for copy offload operations may result in a cache miss.

Embodiments of the present invention provide methods, systems, and computer program products for cache prefetching during an ODX process. Embodiments of the present invention reduce a number of cache misses during READ commands for copy offload operations.

The descriptions of the various embodiments of the present invention have been presented for the purposes of illustration, but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 is a block diagram of SAN environment 100, in accordance with an embodiment of the present invention. SAN environment 100 includes host computer system 110 and data storage system 130, interconnected by network 120. In an embodiment, SAN environment 100 includes one host computer system 110 and one data storage system 130. In another embodiment, SAN environment 100 may include any number of computing devices, similar to that of host computer system 110 and data storage system 130.

Host computer system 110 represents a computing platform of SAN environment 100. Host computer system 110 may be a desktop computer, laptop computer, specialized computer server, or any other computer system known in the art. In certain embodiments, host computer system 110 may represent a computer system utilizing clustered computers and components to act as a single pool of seamless resources when accessed through network 120. For example, such embodiments may be used in data center, cloud computing, SAN, wide area network (WAN), and network attached storage (NAS) applications. In certain embodiments, host computer system 110 represents virtual machines. In general, host computer system 110 is representative of any electronic device, or combination of electronic devices, capable of executing machine-readable program instructions, in accordance with an embodiment of the present invention, as described in greater detail with regard to FIG. 3. In an embodiment, host computer system 110 is implemented in various cloud computing environments, as described in greater detail with regard to FIGS. 4 and 5.

Network 120 can be, for example, a local area network (LAN), a wide area network (WAN) such as the Internet, or a combination of the two, and include wired, wireless, or fiber optic connections. In general, network 120 can be any combination of connections and protocols that will support communications between host computer system 110 and data storage system 130, in accordance with an embodiment of the invention.

Host computer system 110 represents a platform configured to transmit SCSI commands to storage system 130 over network 120. In one embodiment, host computer system 110 includes a client application software program which issues SCSI commands through a SCSI initiator to a SCSI target, as described in greater detail below. In another embodiment, a user can interact with host computer system 110 via an operating system and other storage management tools to configure storage devices connected to SAN environment 100 (i.e., logical units 132 and 134).

Data storage system 130 represents a storage platform configured to receive and execute SCSI commands which are transmitted over network 130. In an embodiment, data storage system 130 includes logical units 132 and 134, cache 136 and copy manager 138. In another embodiment, any number of logical units 132 and 134 may be implemented by data storage system 130. In one embodiment, logical units 132 and 134, cache 136, and copy manager 138 may each be part of separate platforms. In general, data storage system 130 is a storage platform that includes a collection of storage devices, which are represented as logical units 132 and 134 to store data for host computer system 110.

Logical units (LU) 132 and 134 represent storage devices or application programs by which a user or application (e.g., a client application of host computer system 110, a terminal user, or an input/output mechanism) gains access to SAN environment 100. In one embodiment, any storage device or application program that implements LU protocols appears as a LU in SAN environment 100. In various embodiments, a portion of, one of, and/or a collection of storage devices, such as rotating disk storage media and tape drive storage media can be represented by LU 132 and 134. In an exemplary embodiment, a portion of data is designated to be copied from LU 132 to LU 134 in accordance with a copy offload operation issued by host computer 110, as described in greater detail below.

Cache 136 represents a memory component that is configured to store prefetched data during a copy offload operation, in accordance with an embodiment of the present invention. The term, "prefetch," as used herein, refers to transferring data from another memory location (e.g., LU 132 and 134) to cache 136 by beginning a fetch operation for data in advance. Stated differently, "prefetching" is loading data into a temporary storage location (i.e., cache 136) before the data is actually needed for another operation, such as a cache READ. In an embodiment, if a copy offload engine, such as copy manager 138, receives a PT or offloaded READ request, then copy manager 138 instructs cache 136 to start prefetching regions of a source copy location (e.g., LU 132). Storing prefetched data in cache 136 facilitates fewer cache misses during copy offloaded READ requests to cache 136. Furthermore, depending on how fast host computer system 110 sends the off-loaded READ request to data storage system 130, the majority of the portion of the data to be read would already be available in cache 136. Prefetching data in accordance with an embodiment of the present invention avoids the overhead associated with serving the data every time a cache miss occurs when a read is received in response to the off-loaded READ request.

Figure 2:
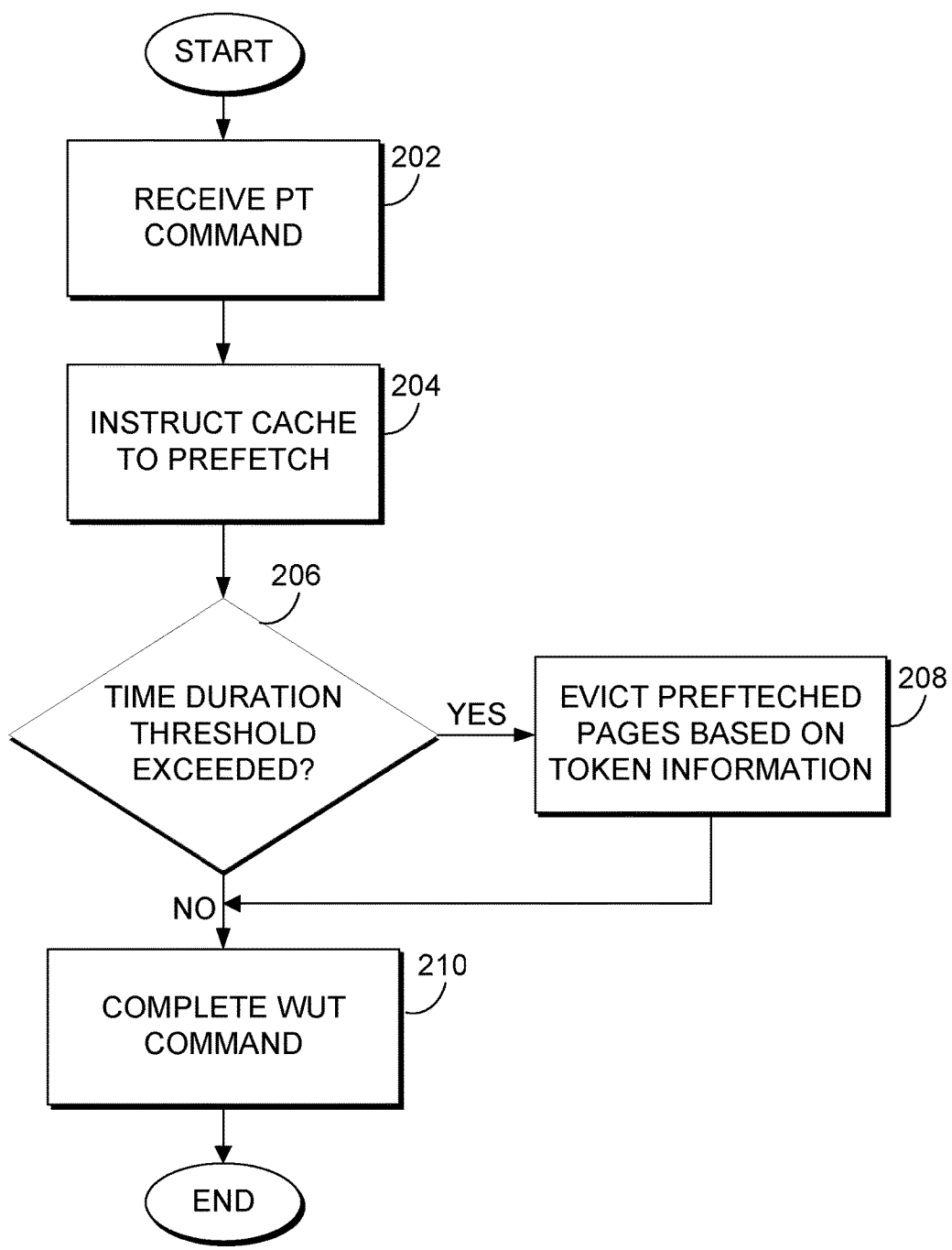
FIG. 2 is a flowchart illustrating operational steps for cache prefetching, in accordance with an embodiment of the present invention.

FIG. 2 is a flowchart illustrating operational steps for cache prefetching, in accordance with an embodiment of the present invention. In an embodiment, copy manager 138 receives a PT command from host computer system 110 to initiate a copy offload operation (step 202). In another embodiment, copy manager 138 may receive an offloaded READ request to initiate a copy offload operation. Subsequently, copy manager 138 instructs cache 136 to start prefetching data indicated by the PT command (step 204). As previously described, the nature of a PT command and a copy offload mechanism allows for prefetching data that is sequential. In one embodiment, step 204 may occur in parallel with offloaded READ requests. The term "parallel" as used herein, refers to a simultaneous performance of operations or near-simultaneous performance of operations. For example, if cache 136 begins to prefetch data while the offloaded READ request is undergoing completion, then cache 136 is considered to be prefetching the data in parallel with completing the offloaded READ request.

In decision 206, it is determined whether a time duration for receiving a WUT command is within a specified threshold. If it is determined that a time duration exceeded a threshold for receiving a WUT command ('yes' branch, decision 206), then the prefetched pages based on the token information are added to the top of the list of cache pages that can be evicted (step 208). For example, if a specified threshold for receiving a WUT command is set at three units of time, and more than three units of time have elapsed without receiving the WUT command, then the operational steps proceed with step 208. In an embodiment, evicting the prefetched pages ensures that caching behavior for the client application I/O operations are not penalized. For example, if the prefetched pages are evicted based on the token information, then cache 136 will be available to handle subsequent client application I/O operations, whereby not penalizing caching behavior of cache 136.

If it is determined that a time duration is not exceeded for receiving a WUT command ('no' branch, decision 206), then the WUT command is completed and then acknowledged by host computer system 110 (step 210). In another embodiment, once the WUT command is completed, the prefetched pages stored in cache 136 are evicted. For example, if a specified threshold for receiving a WUT command is set at three units of time, and less than three units of time have elapsed before receiving the WUT command, then the operational steps proceed with step 210.

Accordingly, advantages of embodiments of the present invention enable for overall increased performance for copy offload operations, because each of the offloaded READS do not result in a cache miss. Furthermore, prefetching of the offloaded READ requests, which tend to be sequential in nature, improves a response time of storage devices, such as rotating disk media. Additionally, if cache 136 is instructed to free or evict pages after a WUT command has been completed, then cache 136 frees these pages immediately instead of waiting for the pages to arrive to the top of a least recently used (LRU) list, similar to that of normal application data pages.

Figure 3:
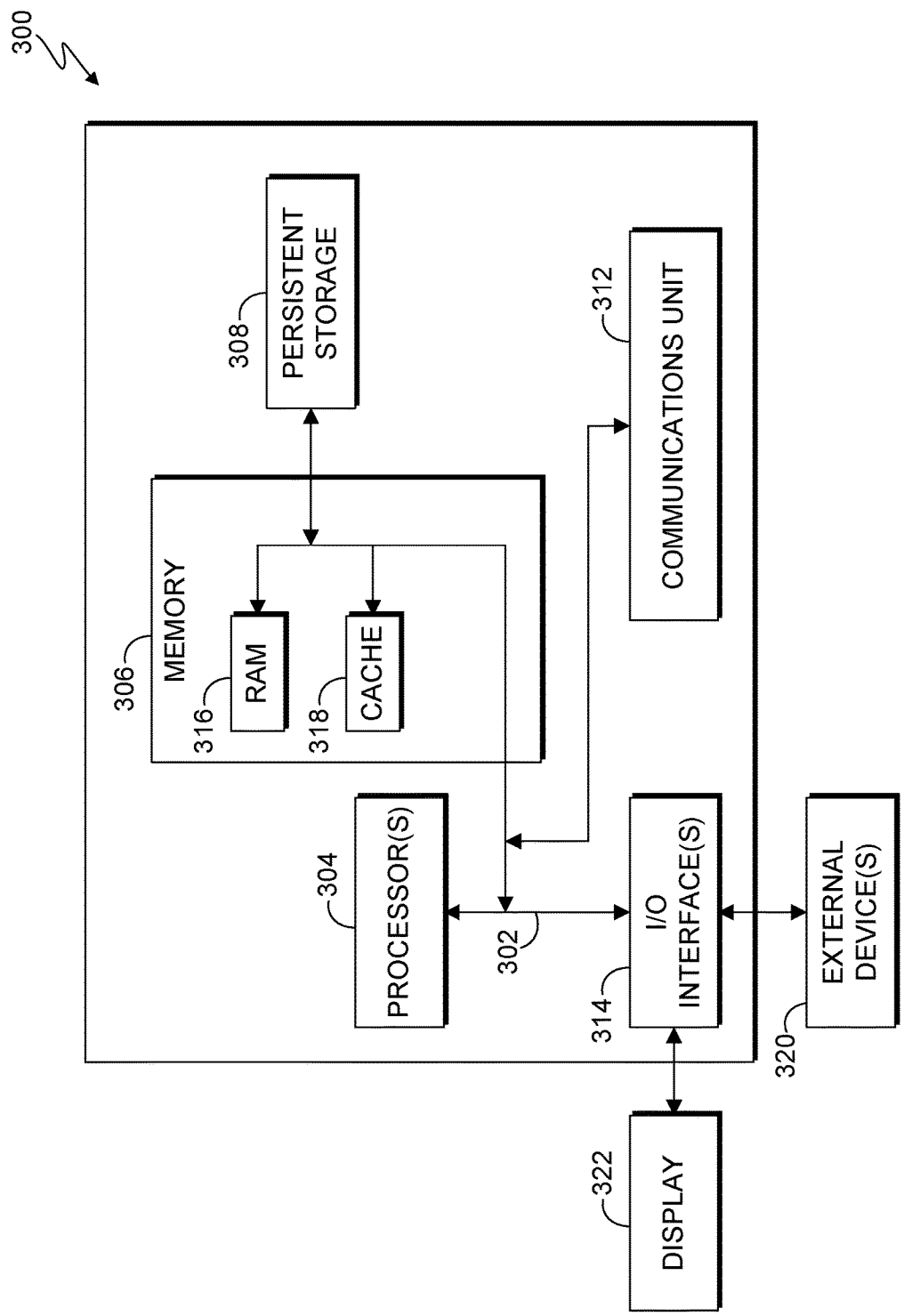
FIG. 3 is a block diagram of internal and external components of the computer systems of FIG. 1, in accordance with an embodiment of the present invention.

FIG. 3 is a block diagram of internal and external components of a computer system 300, which is representative the computer systems of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 300 includes communications fabric 302, which provides for communications between one or more processors 304, memory 306, persistent storage 308, communications unit 312, and one or more input/output (I/O) interfaces 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 418. In general, memory 306 can include any suitable volatile or non-volatile computer-readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer-readable storage medium that is also part of persistent storage 308.

Communications unit 312 provides for communications with other computer systems or devices via a network (e.g., network 120). In this exemplary embodiment, communications unit 312 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 312 (e.g., via the Internet, a local area network or other wide area network). From communications unit 312, the software and data can be loaded onto persistent storage 308.

One or more I/O interfaces 314 allow for input and output of data with other devices that may be connected to computer system 300. For example, I/O interface 314 can provide a connection to one or more external devices 320, such as a keyboard, computer mouse, touch screen, virtual keyboard, touch pad, pointing device, or other human interface devices. External devices 320 can also include portable computer-readable storage media such as, for example, thumb drives, portable optical or magnetic disks, and memory cards. I/O interface 314 also connects to display 322.

Display 322 provides a mechanism to display data to a user and can be, for example, a computer monitor. Display 322 can also be an incorporated display and may function as a touch screen, such as a built-in display of a tablet computer.

Figure 4:
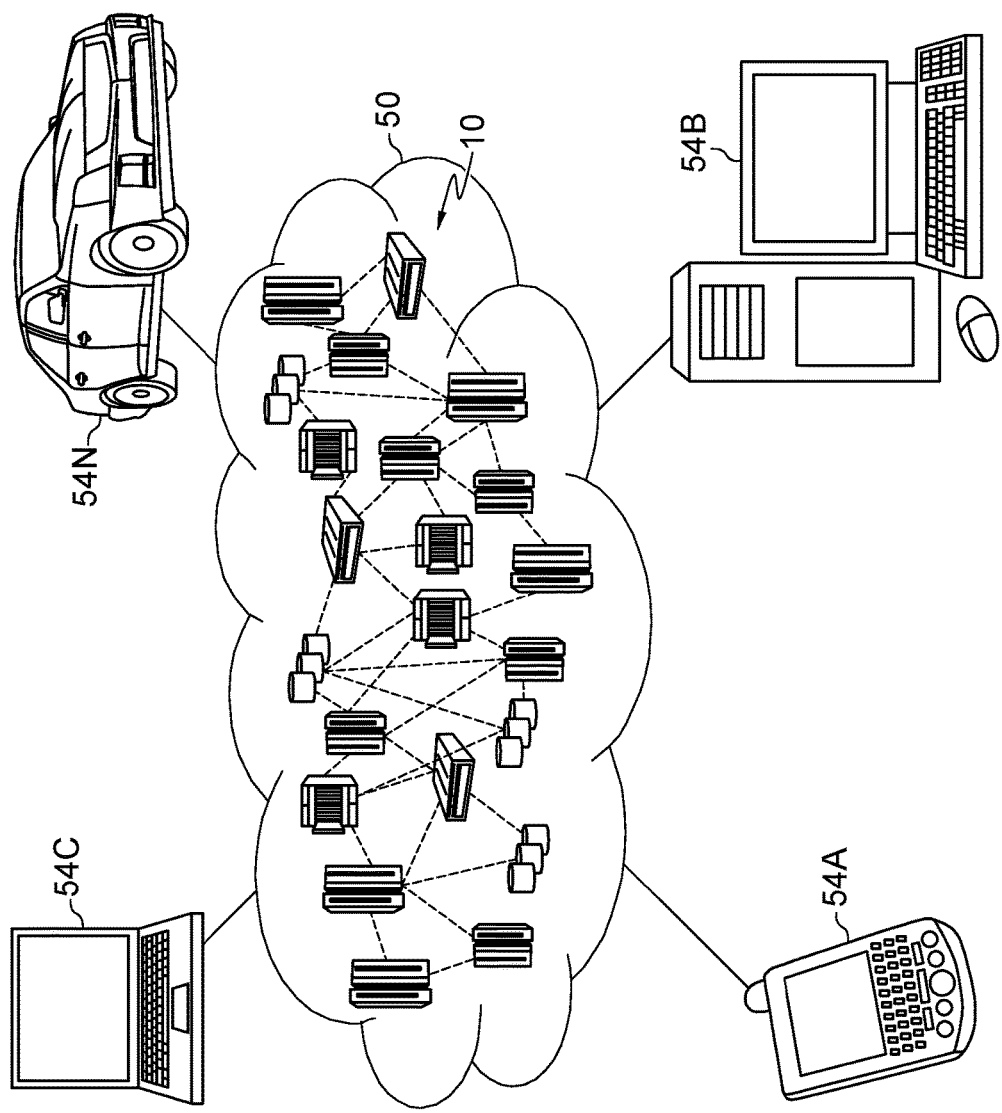
FIG. 4 depicts a cloud computing environment, in accordance with an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. The types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 5:
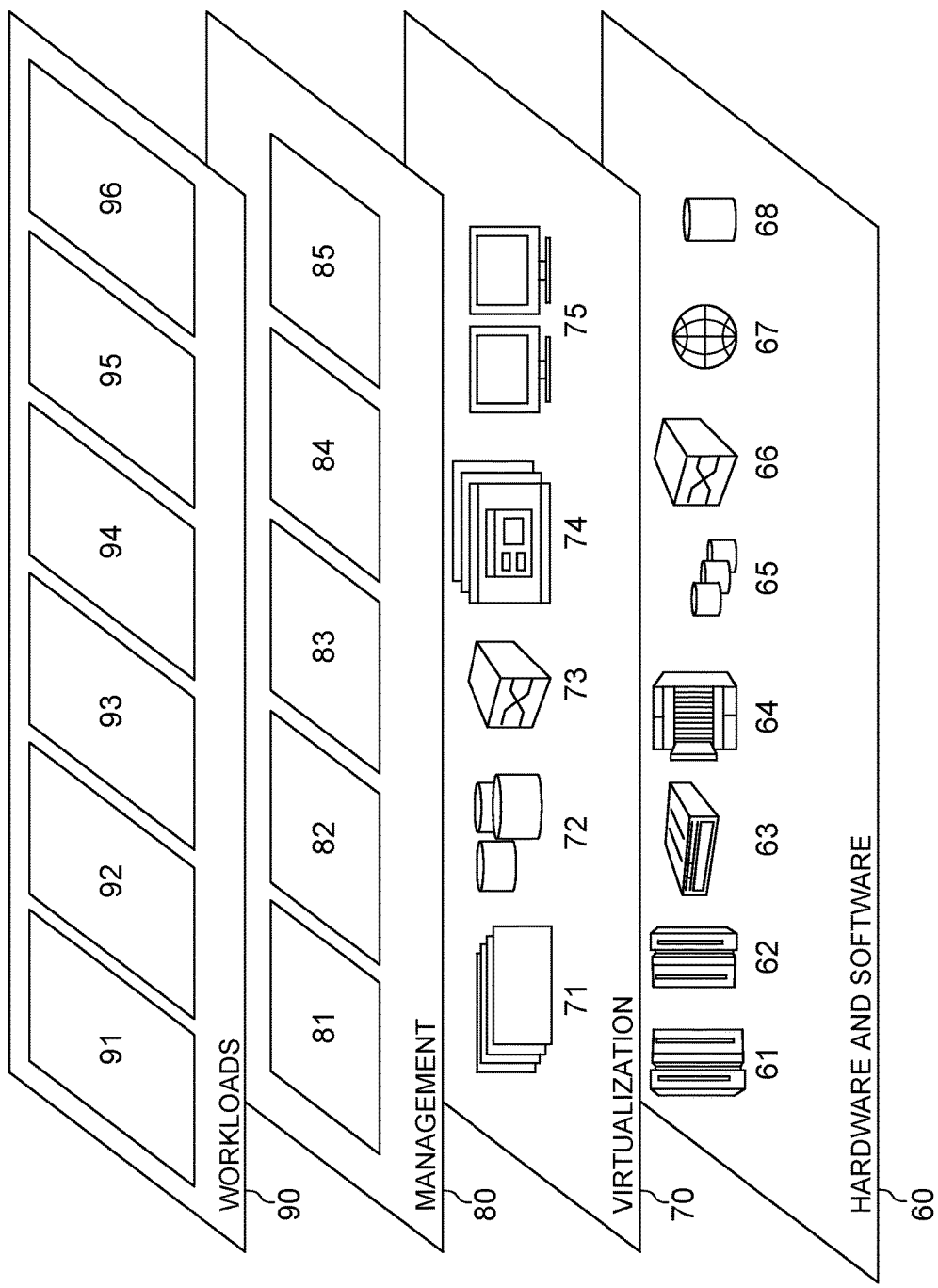
FIG. 5 depicts abstraction model layers, in accordance with an embodiment of the present invention.

Referring now to FIG. 5, a set of functional abstraction layers provided by cloud computing environment 50 (FIG. 4) is shown. The components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud computing environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising: receiving, by one or more computer processors, a populate token command to initiate a copy offload operation;
   responsive to receiving the populate token command, instructing, by the one or more computer processors, a cache of a data storage system in a storage area network environment to prefetch data in accordance with the populate token command and completing an offloaded read request; and
   responsive to determining that a write using token command is not received within a specified time duration, evicting, by the one or more computer processors, the prefetched data stored in the cache; and responsive to determining that the write using token command is received within the specified time duration, completing, by the one or more computer processors, the write using token command; and responsive to completing the write using token command, evicting, by the one or more computer processors, the prefetched data stored in the cache.

2. The method of claim 1, further comprising:
transferring, by the one or more computer processors, the data from one logical unit to another logical unit in a offloaded data transfer process using a copy manager.

3. The method of claim 1, wherein instructing the cache of the data storage system in the storage area network environment to prefetch the data in accordance with the populate token command and completing the offloaded read request, comprises:
prefetching, by the one or more computer processors, the data in accordance with the populate token command in parallel with completing the offloaded read request.

4. The method of claim 2, further comprising:
issuing, by the one or more computer processors, a small computer system interface command from a client application to the copy manager that manages the data storage system to transmit the populate token command.

5. The method of claim 3, further comprising:
receiving, by the one or more computer processors, the offloaded read request to initiate the copy offload operation.

6. A computer program product comprising: one or more computer readable storage media and program instructions stored on the one or more computer readable storage media, the program instructions comprising:
program instructions to receive a populate token command to initiate a copy offload operation; program instructions to, responsive to receiving the populate token command, instruct a cache of a data storage system in a storage area network environment to prefetch data in accordance with the populate token command and completing an offloaded read request; and
program instructions to, responsive to determining that a write using token command is not received within a specified time duration, evict the prefetched data stored in the cache; and
program instructions to, responsive to determining that the write using token command is received within the specified time duration, complete the write using token command; and
program instructions to, responsive to completing the write using token command, evict the prefetched data stored in the cache.

7. The computer program product of claim 6, wherein program instructions stored on the one or more computer readable storage media further comprise:
program instructions to transfer the data from one logical unit to another logical unit in a offloaded data transfer process using a copy manager.

8. The computer program product of claim 6, wherein the program instructions to instruct the cache of the data storage system in the storage area network environment to prefetch the data in accordance with the populate token command and completing the offloaded read request, comprises:
program instructions to prefetch the data in accordance with the populate token command in parallel with completing the offloaded read request.

9. The computer program product of claim 7, wherein program instructions stored on the one or more computer readable storage media further comprise:
program instructions to issue a small computer system interface command from a client application to the copy manager that manages the data storage system to transmit the populate token command.

10. The computer program product of claim 8, wherein program instructions stored on the one or more computer readable storage media further comprise:
program instructions to receive the offloaded read request to initiate the copy offload operation.

11. A computer system comprising: one or more computer processors;
one or more computer readable storage media;
program instructions stored on the one or more computer readable storage media for execution by at least one of the one or more processors, the program instructions comprising:
program instructions to receive a populate token command to initiate a copy offload operation;
program instructions to, responsive to receiving the populate token command, instruct a cache of a data storage system in a storage area network environment to prefetch data in accordance with the populate token command and completing an offloaded read request; and
program instructions to, responsive to determining that a write using token command is not received within a specified time duration, evict the prefetched data stored in the cache; and
program instructions to, responsive to determining that the write using token command is received within the specified time duration, complete the write using token command; and
program instructions to, responsive to completing the write using token command, evict the prefetched data stored in the cache.

12. The computer system of claim 11, wherein program instructions stored on the one or more computer readable storage media further comprise:
program instructions to transfer the data from one logical unit to another logical unit in a offloaded data transfer process using a copy manager.

13. The computer system of claim 11, wherein the program instructions to instruct the cache of the data storage system in the storage area network environment to prefetch the data in accordance with the populate token command and completing the offloaded read request, comprises:
program instructions to prefetch the data in accordance with the populate token command in parallel with completing the offloaded read request.

14. The computer system of claim 12, wherein program instructions stored on the one or more computer readable storage media further comprise:
program instructions to issue a small computer system interface command from a client application to the copy manager that manages the data storage system to transmit the populate token command.

* * * * *